No. 689,646. Patented Dec. 24, 1901.
L. DE INTINIS.
BICYCLE SUPPORT.
(Application filed June 22, 1901.)

(No Model.)

Witnesses

Inventor
L. de Intinis.
By
Attorneys

UNITED STATES PATENT OFFICE.

LINDORO DE INTINIS, OF ST. LOUIS, MISSOURI.

BICYCLE-SUPPORT.

SPECIFICATION forming part of Letters Patent No. 689,646, dated December 24, 1901.

Application filed June 22, 1901. Serial No. 65,712. (No model.)

*To all whom it may concern:*

Be it known that I, LINDORO DE INTINIS, a citizen of the United States, residing in the city of St. Louis, in the State of Missouri, have invented a new and useful Bicycle-Support, of which the following is a specification.

This invention relates generally to bicycle-supports, and more particularly to a portable bicycle-support or one intended to be carried upon the bicycle which it is to support.

The object of this invention is to provide a support of this character which shall be exceedingly cheap and simple in construction and convenient in operation; and with this object in view the invention consists, essentially, of a pair of supporting members or legs adapted to be pivotally connected to the front axle of the machine, said members or legs being connected at their outer ends to a frame carrying a plurality of spring-actuated feet which are adapted to rest upon the earth and provide a broad base or bearing for the support.

The invention consists also in certain details of construction hereinafter set forth, and pointed out in the claim.

Figure 1:
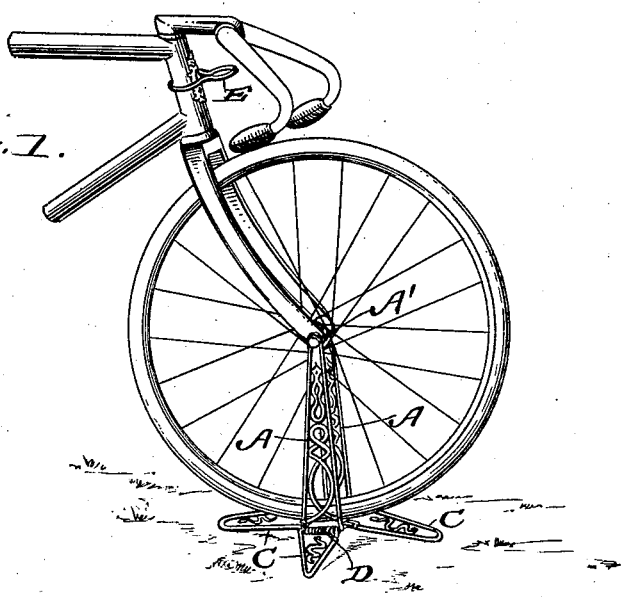
Figure 2:
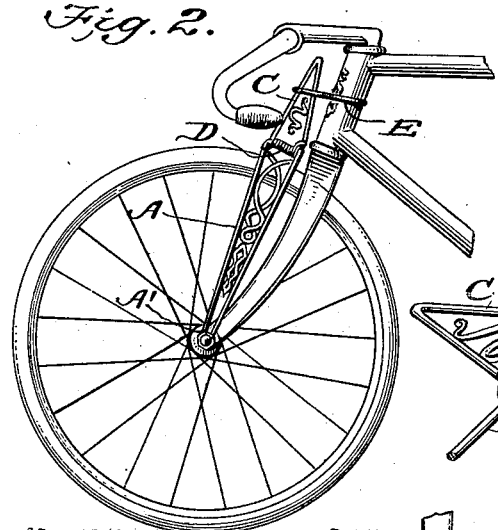
Figure 3:
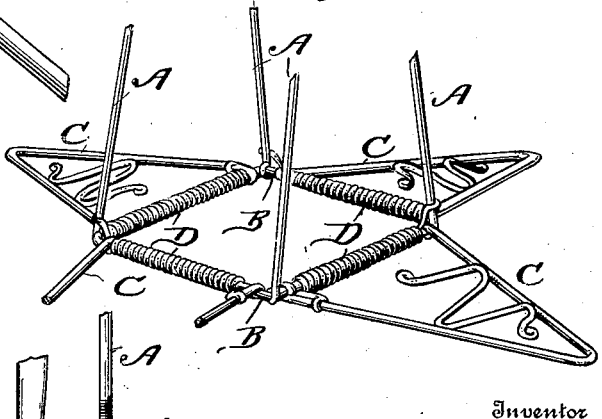
Figure 4:
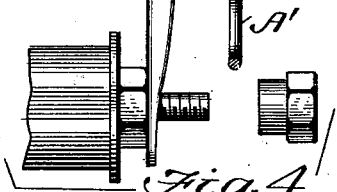

In the drawings forming part of this specification, Figure 1 is a perspective view illustrating the application of my invention. Fig. 2 is a side elevation, the support being shown elevated. Fig. 3 is a detail perspective view showing the supporting-feet, and Fig. 4 is a view illustrating the manner of attaching the support to the front axle of the machine.

In carrying out my invention I prefer to construct the entire device of steel wire, thereby securing great strength, durability, and lightness. The support comprises the side members or legs A, which are bent centrally at A' and pivoted to the front axle of the machine between the front fork and the axle-nut, as most clearly shown in Fig. 4. The side members or legs A are connected at their outer ends to a square frame B, said side members or legs being of a length slightly greater than the radius of the wheel, so that the frame B will clear the tire at all times.

The frame B has a series of feet C attached thereto, each side of the frame having a foot hinged thereto, and in practice I prefer to make this hinge a spring-hinge, the spring D being coiled around the side of the frame and connected to the footpiece, and, if desired, this spring may be integral with the footpiece. The spring D is so arranged that its normal tendency is to throw the feet outwardly, as indicated in Figs. 1 and 3, thereby providing a broad base for supporting the front wheel of the machine.

Figs. 1 and 3 indicate the positions of the various parts while the support is in use, the side members or legs being turned down to a substantially vertical position, and the feet C are substantially horizontal and bearing upon the ground.

When the device is not in use, the side members or legs A are turned up adjacent to the front fork of the machine, and the spring-feet are pressed together and secured by means of a wire loop E, arranged upon the front member of the bicycle-frame.

It will thus be seen that I provide an exceedingly cheap, simple, light, and durable construction of portable bicycle-support and one which can be brought into use at any time desired and one which will accommodate itself to any unevenness of the earth's surface, as each spring-foot being independent will accommodate itself to that part of the ground upon which it bears.

Having thus fully described my invention, what I claim as new, and desire to secure by Letters Patent, is—

A bicycle-support comprising the side members or legs adapted to be secured at their inner ends to the front axle of a bicycle, the outer ends of said legs being connected to a square frame, a footpiece hinged to each side of the frame, and a spring surrounding each side of the frame and bearing upon the footpiece adapted to normally throw the same away from the lug or supporting member, and a loop adapted to be arranged upon the bicycle for the purpose of retaining the spring-feet on the support, substantially as set forth.

LINDORO DE INTINIS.

Witnesses:
L. A. KOLLAS,
GUSTAV STRAUSS.